March 11, 1969 — C. R. NODDINGS ET AL — 3,432,571
PROCESS FOR PRODUCING DIMERS OF TERTIARY OLEFINS
Filed May 4, 1966
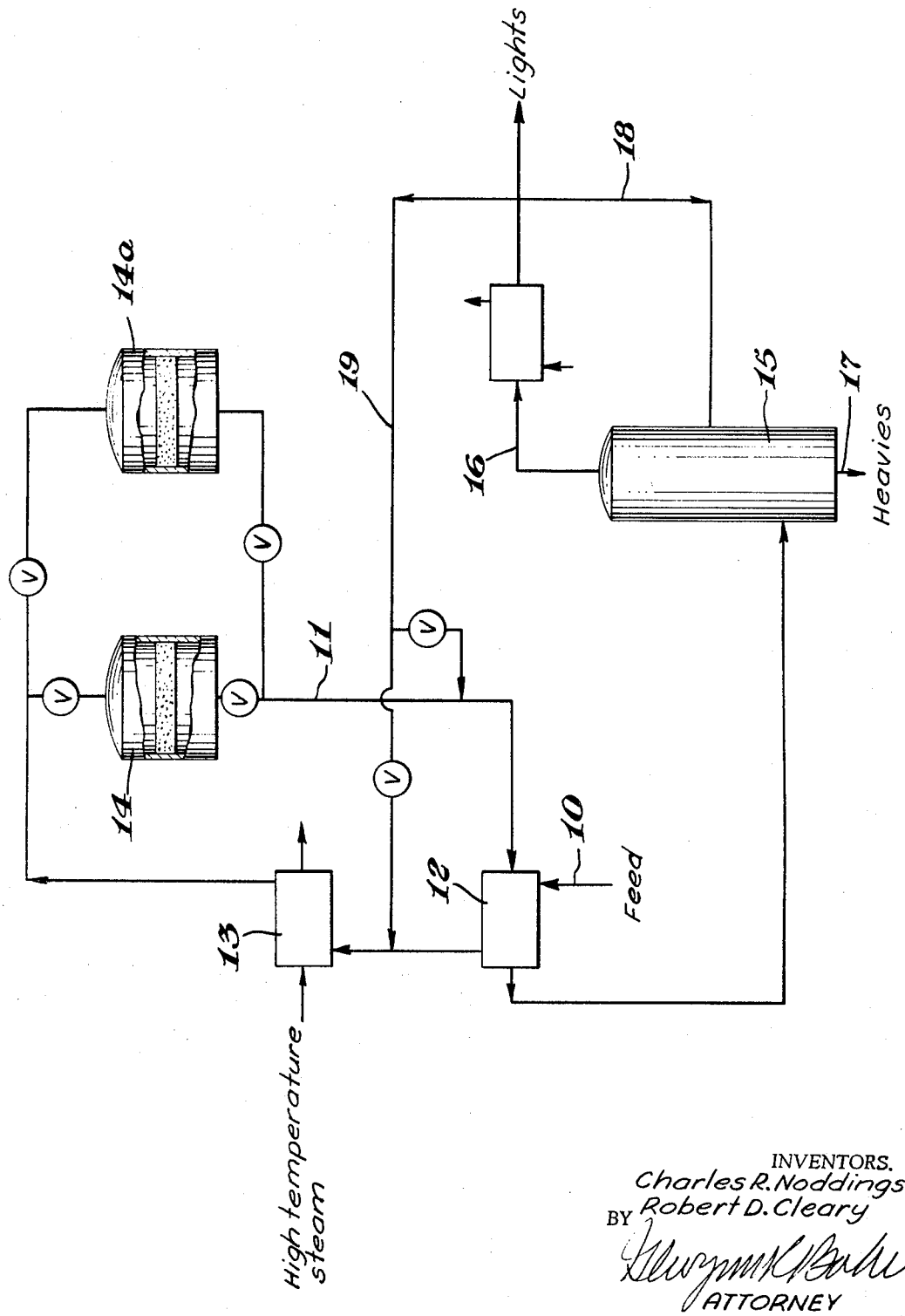
INVENTORS.
Charles R. Noddings
Robert D. Cleary
BY
ATTORNEY United States Patent Office 3,432,571
Patented Mar. 11, 1969

3,432,571
PROCESS FOR PRODUCING DIMERS OF TERTIARY OLEFINS
Charles R. Noddings and Robert D. Cleary, Midland, Mich., assignors to The Dow Chemical Company, Midland, Mich., a corporation of Delaware
Filed May 4, 1966, Ser. No. 547,668
U.S. Cl. 260—683.15
Int. Cl. C07c 3/10, 3/16
6 Claims

ABSTRACT OF THE DISCLOSURE

Tertiary olefins containing 4 to 5 carbon atoms per molecule are dimerized and more particularly removed from admixture with normal olefins by passing the gaseous mixture over montmorillonite clay exchanged after acid activation with chromium or phosphorous in the absence of water vapor to effect the dimerization of the tertiary olefins to produce a stream lean in tertiary olefins at 100° to 200° C. under 70 to 250 p.s.i.g. and at olefin space velocity of about 150 to about 600 v./v./hr. (S.T.P.).

---

It is well known from prior art that an olefin may be dimerized in the presence of various catalysts such as liquid sulfuric acid. The principal disadvantage of the prior art liquid process is one of economics dut to the employment of the highly corrosive sulfuric acid and the attendant steps necessary for recovery of the dimer.

It has now been discovered that activated montmorillonite clay containing phosphate ion or chromic ion deposited by ionically exchanging the clay with phosphoric acid or a chromium salt is more effective as a catalyst for dimerizing tertiary olefins than the prior art catalysts. Exemplary of the utility of the present process is the removal of tertiary butylenes from a n-butylene rich gas stream. The catalysts which are employed in accordance with this invention are fully disclosed in our copending applications Ser. Nos. 547,443 and 547,405 filed May 4, 1966 and entitled "Chromic Ion Containing Clay Catalyst and Process for Producing Alcohols from Olefins" therewith and "Phosphate Ion Containing Catalyst and Process for Producing Alcohols from Olefins" therewith.

Montmorillonite is a clay of the bentonite type, and large deposits thereof are found in various parts of the United States as well as in other parts of the world. It is found in both the sodium form and the calcium form, the former being a swelling bentonite whenever water is present, the latter, the calcium form, is a non-swelling type. The montmorillonite clays have as major constituents silica and alumina and contain a minor amount of either calcium oxide or sodium oxide. Activated montmorillonite is a material which is prepared in a known manner by pretreating the montmorillonite clay with an acid, usually sulfuric acid, which leaches certain impurities from the clay and which acid-treated clay, after washing and drying to remove the acid-susceptible impurities, is in an activated form. This form is well known and used in catalytic cracking. One such treated clay of the calcium form is sold under the name of "Super Filtrol."

The catalyst which is employed in accordance with the present invention is made by preparing a slurry of activated montmorillonite clay in an aqueous solution of phosphoric acid or chromium-cation-containing salt and maintaining the heterogeneous mixture in such slurry form until the amount of phosphate or chromium deposited is approximately equal to the exchange capacity of the clay. While it is to be understood that either form of the clay, that is sodium or calcium form, can be employed, it is preferred to employ a clay that is principally the calcium form. Solutions of from 6 to 12 weight percent chromium salt or phosphoric acid and slurry periods of from 4 to 48 hours are conveniently employed to prepare active catalytic material. The exchange can be done at temperatures varying from room temperature to about 95° C. with no significant change in the activity of the catalyst produced. Preferably the exchange is carried out at the lower end of the temperature range. After the exchange the catalyst is separated from the liquid, water-washed, formed into pellets and dried at a temperature of from 55° to 500° C.

It has been found that the strength of the catalytic materials employed in the process here described can be materially increased by employing a mixture of the two types of montmorillonite clays in the proportions of from 10 to 30 weight percent of the alkali metal form, specifically and preferably the sodium form when the clay has been exchanged with chromium ion. Representative clays which have been employed and add side crushing strength to the finished catalyst are Volclay, a sodium form, and hectorite, a lithium form of the montmorillonite clays. The alkali metal form of the clay which imparts the added side crushing strength to the chromium exchanged alkaline earth form of the clay may be exchanged with chromium. The alkali metal form may be mixed with the alkaline earth form prior to exchange, or may be exchanged in a separate step, then mixed with the chromium exchanged alkali metal form. It is to be understood that the alkali metal form of the clay need not be exchanged and yet when mixed with the alkaline earth form, will still impart side crushing strength although add little or no catalytic activity.

The general process for the vapor phase dimerization of the tertiary olefins comprises passing the tertiary olefin or a gaseous mixture of normal and tertiary olefinic hydrocarbons having from 4 to 5 carbon atoms, which may contain saturated hydrocarbons, at an elevated temperature through the catalyst enclosed in an appropriate converter. The reaction products and unreacted material are separated one from the other by simple distillation.

In accordance with the present invention a vapor mixture of olefins or olefins and alkane is brought into contact with the catalyst maintained at a temperature of from 100° C. to 200° C. and at a pressure of from 70 to about 250 pounds. Within these ranges space velocities of from about 150 volumes to 600 volumes of gas per volume of catalyst per hour (S.T.P.) can be conveniently employed and can be adjusted to maintain constant tertiary olefin removal rate.

Under the above ranges of conditions the percent conversion, that is the mole percent of tertiary olefin converted per pass, is from 20 to 75 percent for tertiary butene feed. The main non-selective reaction products are the polymers of the normal butenes, this being less than about 20 percent loss of n-butene. The greatest loss of n-butene occurs during the first hours of operation of fresh catalyst.

The present process is conveniently carried out by passing the gaseous mixture through the catalyst bed, the reaction product then being distilled to remove the light olefins and alkanes from the dimers and polymers and the lights used as is, recycled or passed through a second catalyst zone. The best mode for carrying out the process is set forth below with particular reference to the drawings. FIGURE 1 shows a block flow diagram for a conventional operation wherein a feed 10 is heat exchanged with a waste heat product stream 11 in heat exchanger 12, then feed 10 passed through heat exchanger 13 and thence into a catalyst bed 14 and/or 14a, the product (reaction) stream 11 after passing through waste heat exchanger 12 is forwarded to a still 15 wherein the light $C_3$–$C_5$ olefins and alkanes are removed overhead 16 and the dimers and polymers removed as bottoms 17. The lights 16 are used as is for further reactions, some used at reflux 18 and some or all 19 not used for reflux returned to the process for a further pass through the catalyst bed if the tertiary butene content is too high.

It is to be understood that the process set forth can be oriented to produce a substantially constant amount of tertiary olefin conversion. This is accomplished by passing the feed through a first catalyst bed for a period of about 1 day to 1 week, then through a second bed for the next 1 day to 1 week period and finally through each bed simultaneously and in parallel for the next 2 days to 2 week period. It is to be understood that flow rates may be altered as necessary to maintain production. Upon completion of this cycle the catalyst beds are changed since the catalyst has lost a considerable portion of its activity. It is also evident that if one desires to have a continuous operation with no down time for catalyst exchange a third catalyst bed is provided for operation during the catalyst change-over period. The order of operation would be bed 1, then 2, then 1+2 in parallel, then 3, then 1 (this bed having been renewed during the period bed 3 is on stream), 1+3 in parallel, 2, 1, and finally 1+2 in parallel. This order of course can be repeated indefinitely.

The following examples illustrate the present invention but are not to be construed as limiting.

Example 1

The data for the following examples were obtained from a laboratory reactor measuring 8 inches long by 1.4 inches internal diameter packed with 200 cubic centimeters of one of the below named catalysts. The reactor was steam-jacketed and maintained at the indicated temperature by controlling the steam to its jacket. The feed compositions, reaction temperatures and pressures, space velocities and product distribution are set forth below. The product stream was analyzed by vapor phase chromatography on coming from the reactor as well as after distillation into several boiling point ranges.

| Type catalyst | Hours run | Temp., °C. | P.s.i.g. | $C_4$ feed v./v./hr. | Feed Percent Isobutene | Feed Percent 1- and 2-butene | Percent Conversion | Percent selectivity to diisobutene | Percent loss of butene-1 and butene-2 |
|---|---|---|---|---|---|---|---|---|---|
| I [1] | 73–84 | 185 | 150 | 576 | 29.7 | 17.1/39.6 | 25.4 | 81.0 | 9.3 |
| I | 85–96 | 185 | 150 | 562 | 29.7 | 17.1/39.6 | 20.3 | 99.7 | 6.0 |
| I | 97–108 | 185 | 150 | 564 | 29.7 | 17.1/39.6 | 21.3 | 96.8 | 6.6 |
| I | 97–108 | 185 | 150 | 552 | 29.7 | 17.1/39.6 | 19.4 | 86.0 | 6.7 |
| II [2] | 6 | 185 | 102 | 611 | 30.1 | 53.1/8.3 | 42.2 | 73.2 | 17.4 |
| II | 4 | 184 | 199 | 673 | 30.4 | 52.6/8.4 | 55.7 | 79.5 | 21.3 |
| II | 6 | 185 | 154 | 624 | 29.7 | 53.7/8.2 | 44.7 | 75.4 | 17.6 |
| II | 6 | 160 | 154 | 631 | 29.8 | 53.5/8.2 | 29.1 | 92.7 | 9.3 |
| II | 6 | 131 | 153 | 628 | 30.2 | 53/8.3 | 10.5 | 100.0 | 3.2 |
| II | 6 | 184 | 150 | 626 | 29.9 | 53.3/8.2 | 38.1 | 83.8 | 13.6 |
| II | 25–42 | 185 | 150 | 561 | 22.0 | 15.4/51.1 | 64.2 | 80.3 | 17.6 |
| II | 67–90 | 185 | 150 | 572 | 22.0 | 15.4/51.1 | 59.5 | 98.5 | 13.7 |
| II | 115–118 | 185 | 150 | 591 | 22.0 | 15.4/51.1 | 40.0 | 78.8 | 11.2 |
| II | 163–186 | 185 | 150 | 580 | 20.6 | 8.8/57.2 | 34.8 | 91.9 | 7.7 |
| I | 1–12 | 185 | 150 | 574 | 30.4 | 16.8/38.2 | 67.7 | 78.7 | 26.2 |
| I | 13–24 | 185 | 150 | 609 | 30.4 | 16.8/38.2 | 50.4 | 88.7 | 17.3 |
| I | 25–36 | 185 | 150 | 560 | 29.1 | 16.5/40.9 | 48.3 | 74.9 | 18.8 |
| I | 37–48 | 185 | 150 | 540 | 29.1 | 16.5/40.9 | 35.4 | 79.7 | 12.9 |
| I | 49–60 | 185 | 150 | 570 | 29.1 | 16.5/40.9 | 28.9 | 85.0 | 9.9 |
| I | 61–72 | 185 | 150 | 564 | 29.7 | 17.1/39.6 | 27.7 | 84.7 | 9.7 |
| II | 10 | 185 | 150 | 571 | 22.0 | 15/51 | 65.8 | 65.4 | 22.1 |
| II | 50 | 185 | 150 | 556 | 22.0 | 15/51 | 56.0 | 70.4 | 17.5 |
| II | 100 | 185 | 150 | 569 | 22.0 | 15/51 | 42.5 | 73.6 | 12.7 |
| II | 150 | 185 | 150 | 588 | 22.0 | 15/51 | 37.8 | 55.0 | 15.1 |
| II | 190 | 185 | 150 | 573 | 20.4 | 9/57 | 32.7 | 99.2 | 6.7 |

[1] A montmorillonite activated clay exchanged with Cr as $CrCl_3$ as 6% solution for 48 hours at 95–100° C., then dried at 125° C. after washing to chloride free wash water. (Example 1 of copending application Serial No. 547,443).
[2] The catalyst was prepared by ion exchange of Super Filtrol with a 6% solution of $H_3PO_4$ for 24 hours at room temperature then dried at 125° C. (Example 1 of copending application Serial No. 547,405).

We claim:
1. A method for dimerizing tertiary olefins having from 4 to 5 carbon atoms which comprises passing a tertiary olefin at a temperature of about 100° C. to about 200° C. in the substantial absence of water and under a pressure of from about 70 to 250 p.s.i.g., and at a space velocity of from about 150 to about 600 volumes of gas per volume of catalyst per hour (S.T.P.) over a montmorillonite catalyst containing an ion selected from the group consisting of phosphate ion ($PO_4^{---}$) and chromic ion ($Cr^{+++}$) in an amount about equal to the exchange capacity of the montmorillonite and prepared by treating a montmorillonite clay with a strong acid, washing and drying said clay, and contacting said so-treated clay with a solution of a chromium cation containing salt or phosphoric acid for a time from 4–48 hours at a temperature from room temperature to about 95° C.

2. The method of claim 1 wherein said olefin is fed at a space velocity increasing incrementally with time thereby to obtain a constant yield of the desired dimerized product.

3. The method according to claim 2, wherein three reactors are employed, two of which are run in consecutive series until the space velocity of each has reached about 600 volumes of gas per volume of catalyst per hour (S.T.P.), then the two reactors are run simultaneously in parallel until each again has reached about 600 volumes of gas per volume of catalyst, thereby to produce a constant yield of product over the entire operation period.

4. A method according to claim 1 wherein the tertiary olefin is in admixture with at least one other non-tertiary olefin and said tertiary olefin is selectively dimerized.

5. The method of claim 4 wherein said olefin is fed at a space velocity increasing incrementally with time thereby to obtain a constant yield of the desired dimerized product.

6. A method for dimerizing a tertiary olefin according to claim 5, wherein three reactors are employed, two of which are run in consecutive series until the space velocity of each has reached about 600 volumes of gas per volume of catalyst per hour (S.T.P.), then the two reactors are run in parallel simultaneously until each again has reached about 600 volumes of gas per volume of catalyst, thereby to produce a constant yield of product over the entire operation period.

References Cited

UNITED STATES PATENTS

| | | | |
|---|---|---|---|
| 2,057,433 | 10/1936 | Ipatieff | 260—683.15 |
| 2,101,857 | 12/1937 | Ipatieff et al. | 260—683.15 |
| 2,825,721 | 3/1958 | Hogan et al. | 260—683.15 X |
| 3,170,885 | 2/1965 | Morrell | 260—683.15 X |

PAUL M. COUGHLAN, Jr., *Primary Examiner.*

U.S. Cl. X.R.

252—437, 450.